United States Patent
Zhou

(10) Patent No.: US 12,236,090 B2
(45) Date of Patent: *Feb. 25, 2025

(54) HOST RATE ADJUSTMENT USING FREE SPACE VALUES

(71) Applicant: Micron Technology, Inc., Boise, ID (US)

(72) Inventor: Donghua Zhou, Suzhou (CN)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,743

(22) Filed: Apr. 8, 2024

(65) Prior Publication Data

US 2024/0256127 A1    Aug. 1, 2024

Related U.S. Application Data

(63) Continuation of application No. 17/961,050, filed on Oct. 6, 2022, now Pat. No. 11,977,736.

(30) Foreign Application Priority Data

Aug. 17, 2022   (WO) ................ PCT/CN2022/112925

(51) Int. Cl.
   *G06F 3/06*    (2006.01)
(52) U.S. Cl.
   CPC .......... *G06F 3/0608* (2013.01); *G06F 3/0613* (2013.01); *G06F 3/0634* (2013.01); *G06F 3/0653* (2013.01); *G06F 3/0679* (2013.01)
(58) Field of Classification Search
   None
   See application file for complete search history.

(56) References Cited

U.S. PATENT DOCUMENTS

| | | |
|---|---|---|
| 11,556,258 B1 | 1/2023 | Huang et al. |
| 2018/0081832 A1 | 3/2018 | Longo et al. |
| 2018/0188952 A1 | 7/2018 | Carlton et al. |
| 2019/0004946 A1 | 1/2019 | Li et al. |
| 2019/0187928 A1 | 6/2019 | Agarwal |
| 2020/0026437 A1 | 1/2020 | Bi et al. |
| 2021/0034512 A1 | 2/2021 | Shin et al. |
| 2022/0129167 A1 | 4/2022 | Chen et al. |
| 2022/0269435 A1 | 8/2022 | Yoon |

FOREIGN PATENT DOCUMENTS

CN    110262827 A    9/2019

OTHER PUBLICATIONS

International Search Report and Written Opinion, PCT App. No. PCT/CN2022/112925, Dec. 22, 2022, 9 pages.
Notice of Allowance, U.S. Appl. No. 17/961,050, Jan. 9, 2024, 9 pages.

*Primary Examiner* — Kaushikkumar M Patel
(74) *Attorney, Agent, or Firm* — NICHOLSON DE VOS WEBSTER & ELLIOTT LLP

(57) ABSTRACT

Methods, systems, and apparatuses include receiving a current free space value and a historic delta value. A delta value is calculated using the current free space value, a target free space value, and the historic delta value. A delta region is determined using the delta value. A new host rate is calculated using the determined delta region, the calculated delta value, and the historic delta value. The new host rate is sent to a host device causing the host device to change a current host rate to the new host rate.

20 Claims, 7 Drawing Sheets

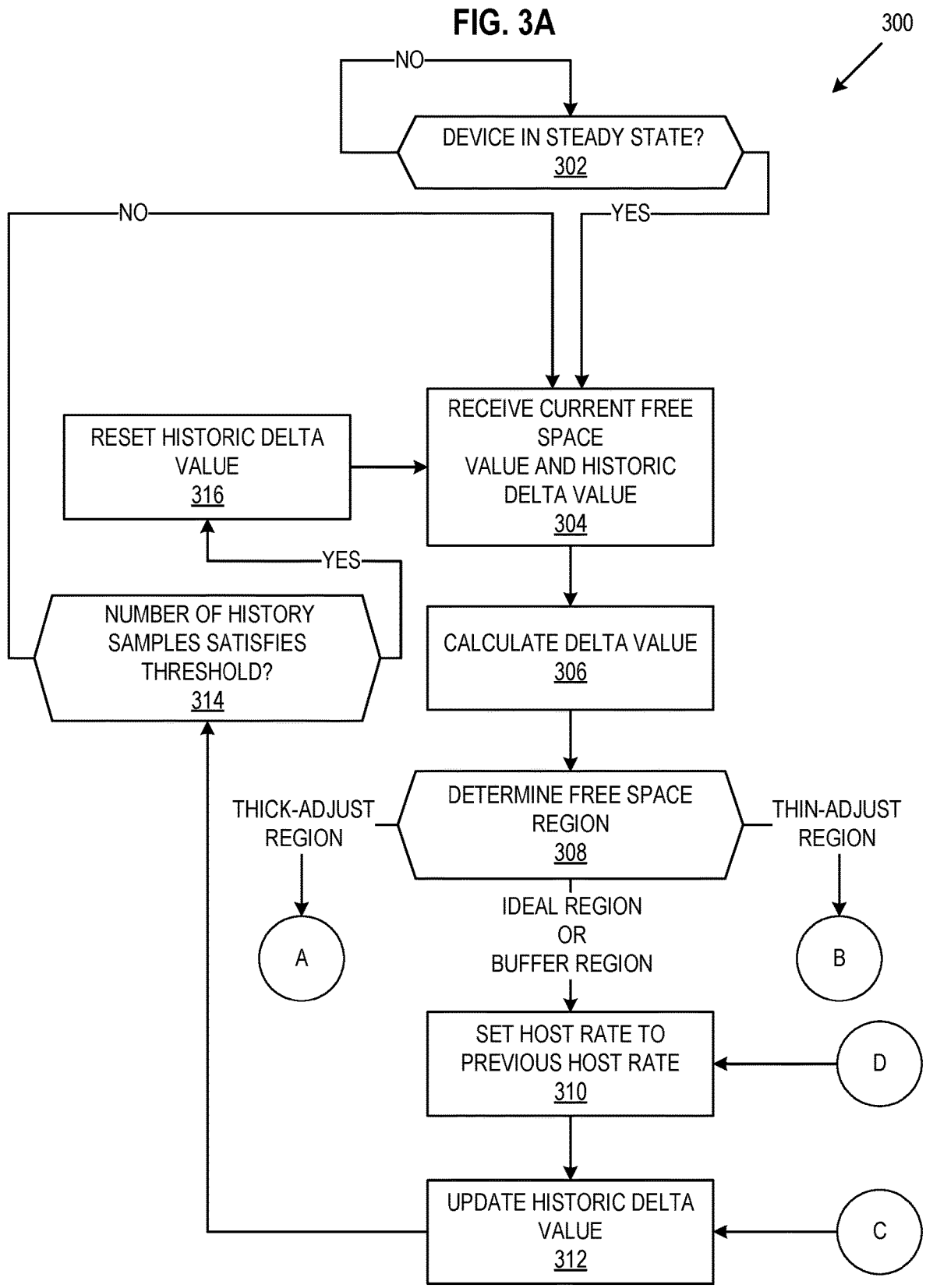

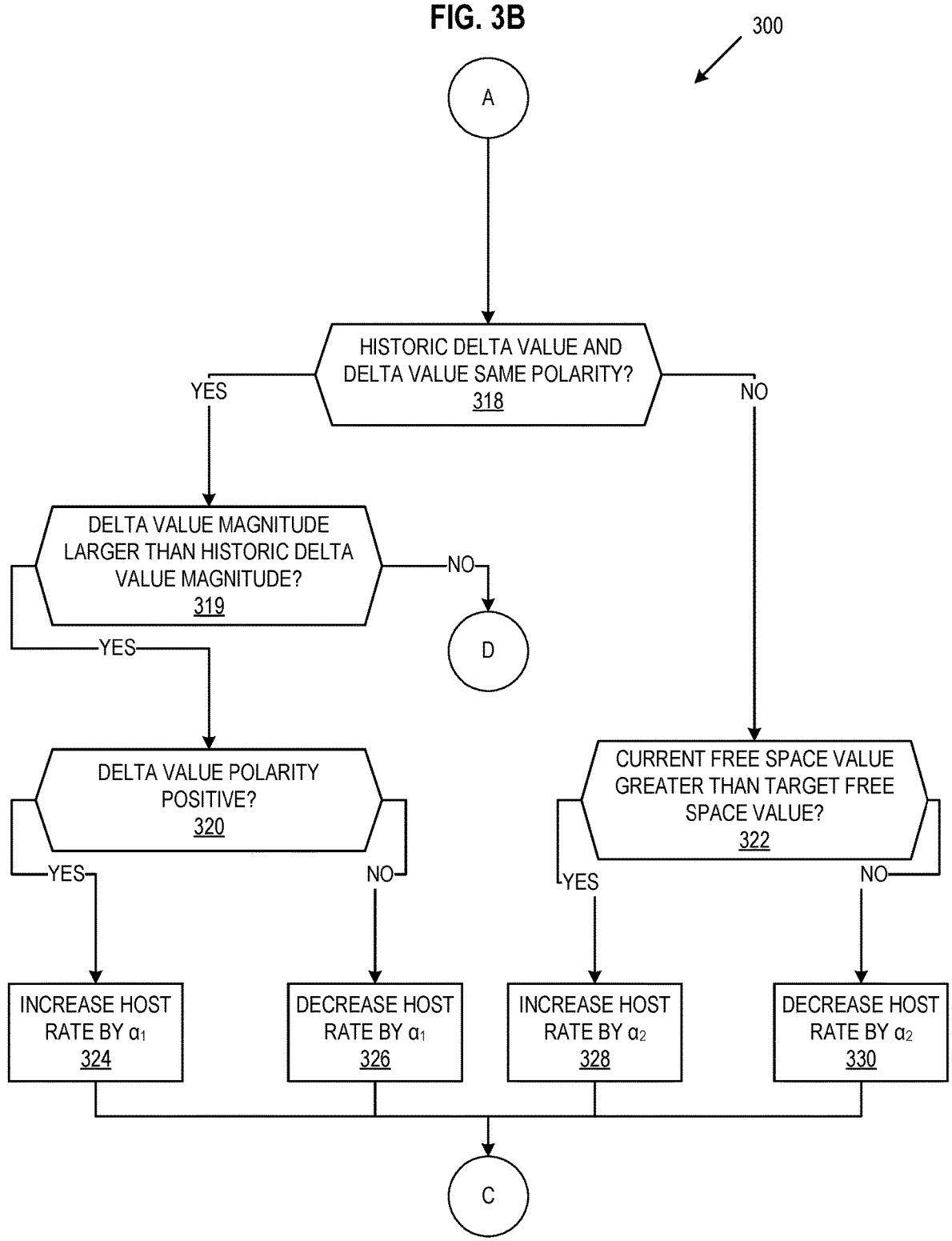

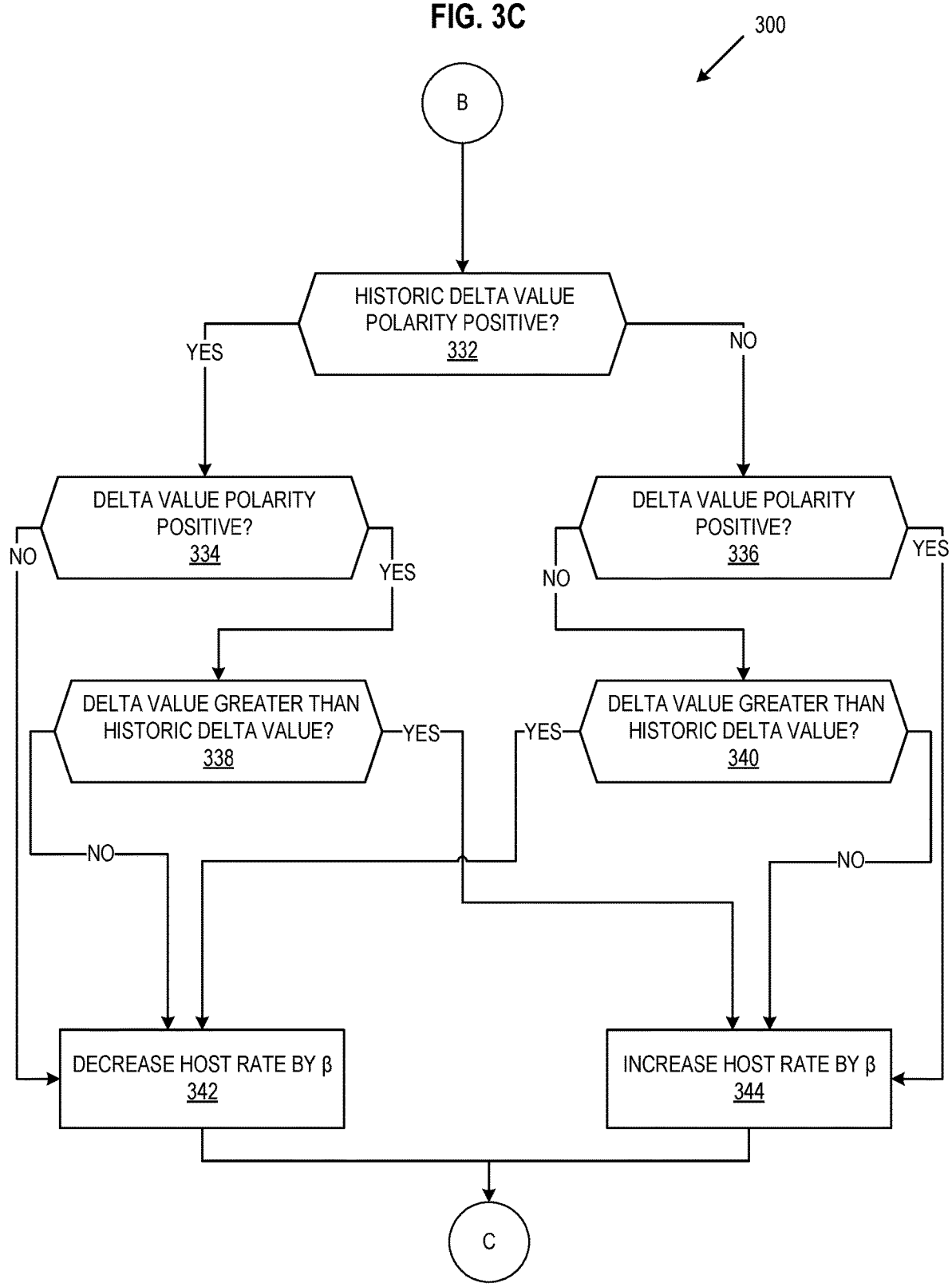

HOST RATE ADJUSTMENT USING FREE SPACE VALUES

CROSS-REFERENCE TO RELATED APPLICATION

The present application is a continuation of U.S. application Ser. No. 17/961,050, filed Oct. 6, 2022, which claims the benefit of International Application No. PCT/CN2022/112925 filed on Aug. 17, 2022, which is hereby incorporated by reference.

TECHNICAL FIELD

The present disclosure generally relates to host rate adjustment, and more specifically, relates to host rate adjustment using free space values.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 3A, 3B, and 3C illustrate a flow diagram of an example method to adjust host rate using free space values in accordance with some embodiments of the present disclosure.

DETAILED DESCRIPTION

Figure 1:
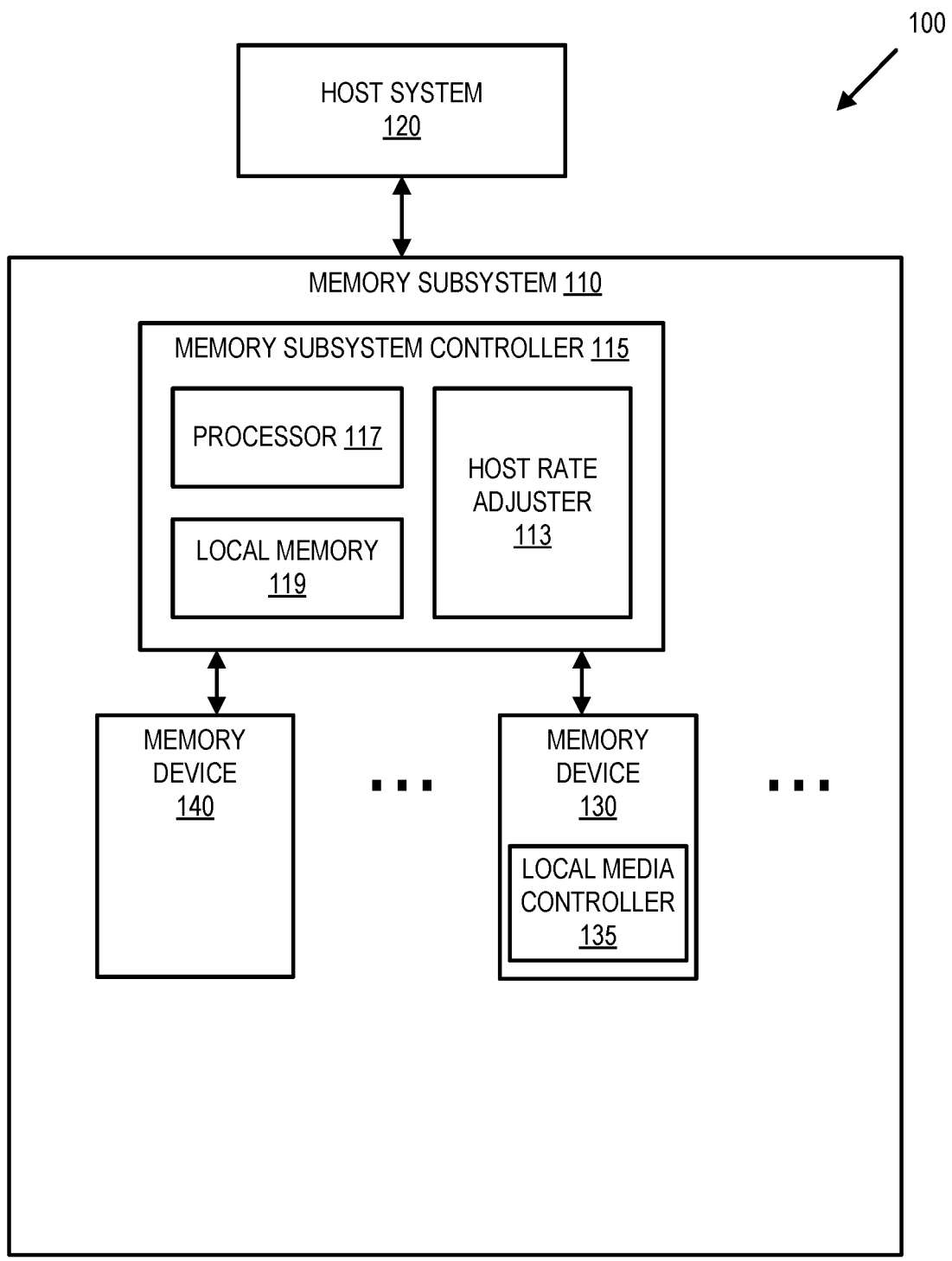
FIG. 1 illustrates an example computing system that includes a memory subsystem in accordance with some embodiments of the present disclosure.

Aspects of the present disclosure are directed to adjusting host rates using free space values in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

Conventional memory systems receive data from host systems to write to memory, including non-volatile memory (e.g., a NAND memory devices). NAND memory devices are subdivided into blocks composed of writeable units, such as pages. Pages typically cannot be overwritten. Therefore, there must be free space to write to a NAND memory device. To create free space, memory subsystems perform a garbage collection process that includes erasing all the data in a block or subdivisions of the block while writing valid data to a new block. When a memory subsystem enters steady state, the amount of free space available is dictated by the garbage collection rate (rate at which space is freed) and the host rate (rate at which space is consumed). When the garbage collection rate is higher than the host rate, there is a lot of free space, but files may be more dispersed, causing a higher random write input/output operations per second (IOPS). Conversely, when the host rate is higher than the garbage collection rate, there can be insufficient free space and the host may have to wait for garbage collection before it can write, degrading performance.

Aspects of the present disclosure address the above and other deficiencies by adjusting the host rate based on the current free space and a target free space. The amount of free space can be adjusted by changing the host rate. For example, increasing the host rate will decrease the amount of free space and vice versa. By adjusting the host rate to reach an ideal amount of free space, the memory subsystem can attain optimal random write IOPS while reducing the likelihood of the host waiting for garbage collection to write.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes a host rate adjuster 113 that can change the host rate based on the amount of free space. In some embodiments, the controller 115 includes at least a portion of the host rate adjuster 113. For example, the controller 115 can include a processor 117 (processing device) configured to execute instructions stored in local memory 119 for performing the operations described herein. In some embodiments, host rate adjuster 113 is part of the host system 120, an application, or an operating system.

The host rate adjuster component 113 can adjust the host rate based on differences between the current free space and a target free space as well as differences between previous free space and the target free space. Further details with regards to the operations of the host rate adjuster 113 are described below.

Figure 2:
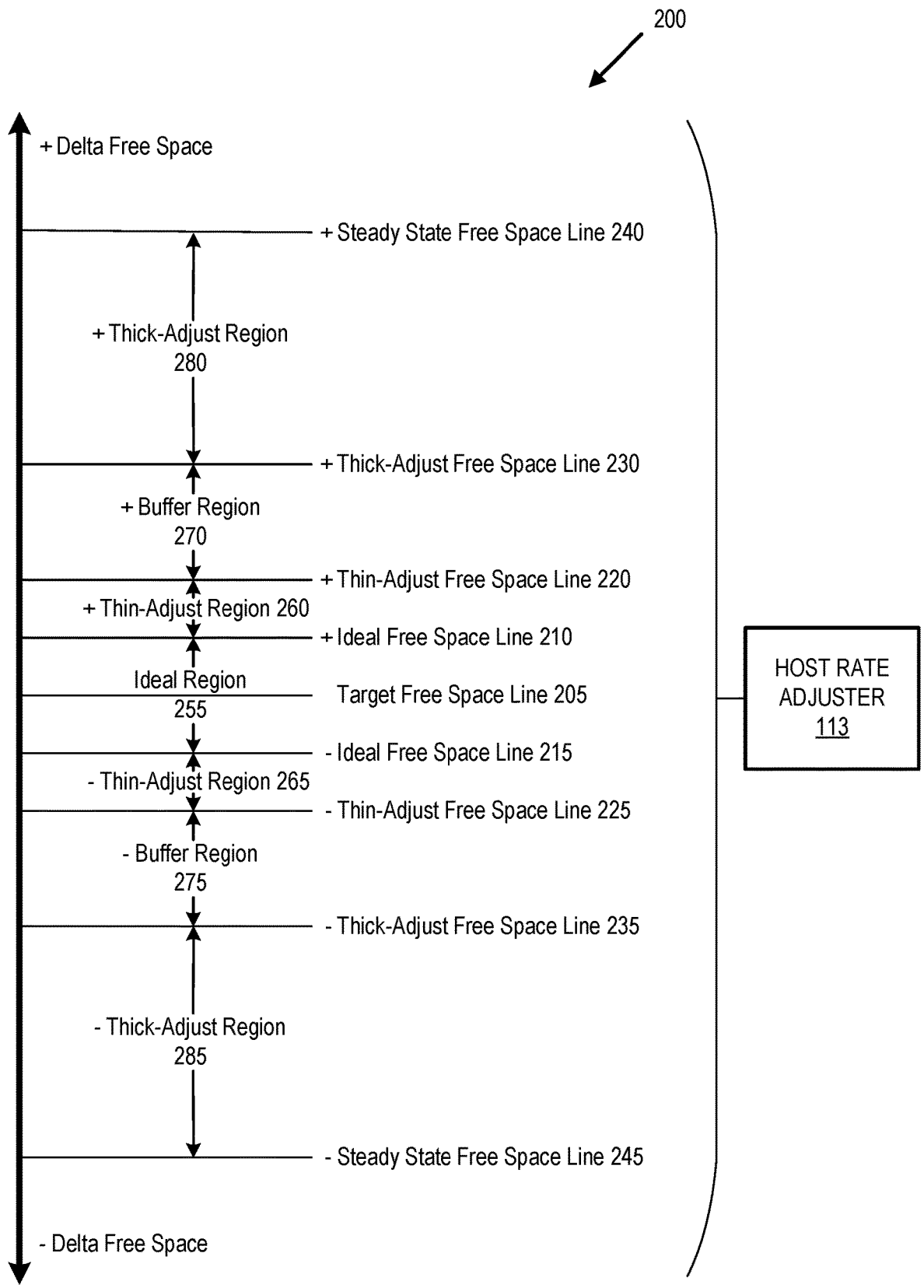
FIG. 2 illustrates an example graph of host rates and delta regions in accordance with some embodiments of the present disclosure.

FIG. 2 illustrates an example host rate and free space graph 200 in accordance with some embodiments of the present disclosure. Host rate graph 200 includes target free space line 205, positive ideal free space line 210, negative ideal free space line 215, positive thin-adjust free space line 220, negative thin-adjust free space line 225, positive thick-adjust free space line 230, negative thick-adjust free space line 235, positive steady state free space line 240 and negative steady state free space line 245.

The vertical axis of host rate and free space graph 200 represents delta free space values (i.e., delta values). A host rate adjuster, such as host rate adjuster 113 of FIG. 1 determines a delta value using a current free space value, a target free space value, and a historic delta value. The current free space value is a value representing the amount of space in a memory device, such as memory device 140 of FIG. 1, that does not store data or does not store valid data. For example, free space can include the scanned space of a source block to be deleted during garbage collection. Host rate adjuster 113 determines the delta value at a given time t by the following equation: DeltaValue(t)=FreeSpace(t)−TargetFreeSpace+HistoricDeltaValue(t), where (t) represents the time of the current host rate adjustment. The historic delta value is a value representing one or more previous delta values from one or more host adjustment iterations performed by host rate adjuster 113. For example, the historic delta value is the delta value used for the previous host rate adjustment and is determined by the following equation: HistoricDeltaValue(t)=FreeSpace(t−1)−TargetFreeSpace+HistoricDeltaValue(t−1), where (t−1) represents the time of the previous host rate adjustment. In some embodiments, host rate adjuster 113 also tracks how many samples are stored and clears HistoricDeltaValue when the samples stored reaches a sample threshold value. The sample threshold value may be predetermined or may be determined based on characteristics of the system such as desired host rate adjustment frequency.

Target free space line 205 indicates the optimal free space for the memory subsystem, such as memory subsystem 110 of FIG. 1. The target free space line 205 (i.e., target free space value) is a free space value indicating a balance between the production of free space (e.g., as a result of garbage collection) and the consumption of free space (e.g., due to host writes). Each of the positive free space lines 210, 220, 230, and 240 indicate a positive difference (i.e., delta) between a free space value and target free space line 205. In other words, positive free space lines 210, 220, 230, and 240 represent free space values that are greater than target free space line 205. Conversely, each of the negative free space lines 215, 225, 235, and 245 indicate a negative difference (i.e., delta) between a free space value and target free space line 205, meaning that the free space value is less than target free space line 205.

The actual delta free space value of the free space lines 210, 215, 220, 225, 230, 235, 240, and 245 is calculated using a relationship to the value of target free space line 205. Each of the free space line pairings: positive and negative ideal free space lines 210 and 215, positive and negative thin-adjust free space lines 220 and 225, positive and negative thick-adjust free space lines 230 and 235, and positive and negative steady state free space lines 240 and 245 have equal absolute values to the respective paired line. The value of target free space line 205 is represented by TargetFreeSpace. The remaining free space lines are calculated according to $FS_{target}$ as follows: the values of ideal free space lines 210 and 215 are represented by $$\pm \frac{1}{2a}$$

TargetFreeSpace, the values of thin-adjust free space lines 220 and 225 are represented by $$\pm \frac{1}{2b}$$

TargetFreeSpace, the values thick-adjust free space lines 230 and 235 are represented by $$\pm \frac{1}{2c}$$

TargetFreeSpace, and the values of steady state free space lines 240 and 245 are represented by $$\pm \frac{1}{2d}$$

TargetFreeSpace.

Each of the values a, b, c, and d differs according to the requirements and advantages of the host system and memory subsystem, such as host system 120 and memory subsystem 110 of FIG. 1. For example, a system with a higher performance consistency target may also have lower values for a, b, c, and d. A performance consistency target is measured using a given percentile of the slowest IOPS divided by the average IOPS. For example, the performance consistency may be measured using the $99.9^{th}$ percentile slowest IOPS divided by the average IOPS, resulting in a performance consistency target of 0.1%. The respective hierarchy of values a, b, c, and d, however, remains constant. The largest value is a, followed by b, followed by c, and the smallest value is d. In some embodiments, the differences between the values also remains constant. For example, the largest difference between consecutive values is between a and b, followed by b and c, and the smallest difference between consecutive values is between c and d. In one such embodiment, a=64, b=16, c=4, and d=2. In this embodiment, ideal free space lines 210 and 215 are represented by $\pm \frac{1}{128} FS_{target}$, thin-adjust free space lines 220 and 225 are represented by $\pm \frac{1}{32} FS_{target}$, thick-adjust free space lines 230 and 235 are represented by $\pm \frac{1}{8} FS_{target}$, and steady state free space lines 240 and 245 are represented by $\pm \frac{1}{4} FS_{target}$.

Host rate graph 200 also includes regions between the free space lines including ideal region 255, positive thin-adjust region 260, negative thin-adjust region 265, positive buffer region 270, negative buffer region 275, positive thick-adjust region 280, and negative thick-adjust region 285. Each of the regions indicate a contiguous range of delta free space values between a corresponding pair of the free space lines. For example, ideal region 255 is the range of values between positive ideal free space line 210 and negative ideal free space line 215. Positive thin-adjust region 260 is the range of values between positive thin-adjust free space line 220 and positive ideal free space line 210. Positive buffer region 270 is the range of values between the positive thick-adjust free space line 230 and positive thin-adjust free space line 220. Positive thick-adjust region 280 is the range of values between the positive steady state free space line 240 and positive thick-adjust free space line 230. Negative thin-adjust region 265 is the range of values between negative thin-adjust free space line 225 and negative ideal free space line 215. Negative buffer region 275 is the range of values between the negative thick-adjust free space line 235 and negative thin-adjust free space line 225. Negative thick-adjust region 285 is the range of values between the negative steady state free space line 245 and negative thick-adjust free space line 235.

As explained above, the largest value is a, followed by b, followed by c, and the smallest value is d. Similarly, in some embodiments, the largest difference between consecutive values is between a and b, followed by b and c, and the smallest difference between consecutive values is between c and d. In such embodiments, ideal region 255 is the smallest region, followed by thin-adjust regions 260 and 265, followed by buffer regions 270 and 275, and thick-adjust regions 280 and 285 are the largest regions.

A host rate adjuster, such as host rate adjuster 113 of FIG. 1, updates the host rate according to host rate graph 200. In some embodiments, host rate adjuster 113 instead updates the garbage collection rate. Because the garbage collection rate is the inverse of the host rate (i.e., host rate+garbage collection rate=a constant), embodiments using the garbage collection rate would have the reverse operations (e.g., increasing garbage collection rate instead of decreasing host rate). For thin-adjust regions 260 and 265, host rate adjuster 113 increases or decreases the host rate by thin adjustment value β. Host rate adjuster 113 determines whether to increase or decrease the host rate (i.e., determines the adjustment polarity) based on the delta value and the historic delta value. Host rate adjuster 113 compares the polarity of the historic delta value and the delta value. When the polarity of historic delta value and the delta value are opposite, the delta free space has moved from one side of ideal free space line 210 to the thin-adjust region 260 or 265 on the other side. For example, when the historic delta value is negative and the delta value is positive, the delta free space has moved from below target free space line 205 to positive thin-adjust region 260 above target free space line 205. Host rate adjuster 113 therefore increases the host rate by thin adjustment value β to allow the host to consume free space at a rate that outstrips free space freed by garbage collection, eventually causing the delta free space value to decrease closer to ideal region 255 and target free space line 205. When the polarity of historic delta value and the delta value are the same, the delta free space has remained on the same side of ideal free space line 210. The previous delta value could have been in thick-adjust regions 280 and 285, buffer regions 270 and 275, thin-adjust regions 260 and 265 or ideal region 255. Accordingly, host rate adjuster 113 adjusts the host rate based on the difference between the delta value and the historic delta value. For example, when the historic delta value and the delta value are both positive and the delta value is larger than the historic delta value, the delta free space has moved from away from the target free space line 205. Host rate adjuster 113 therefore increases the host rate by thin adjustment value β to consume more free space, eventually causing the delta free space value to decrease closer to ideal region 255 and target free space line 205. When historic delta value and the delta value are both positive, but the delta value is smaller than the historic delta value, the delta free space value has moved toward the target free space line 205. In order to prevent overcorrection, host rate adjuster 113 decreases the host rate by thin adjustment value β to create more free space.

The value of thin adjustment value β is determined according to the performance consistency target. For example, for a performance consistency measured using the 99.9th percentile slowest IOPS divided by the average IOPS, the performance consistency target is 0.1%. Any adjustments made to the host rate should therefore be less than 0.1% in order for the performance consistency target to be reachable. Thin adjustment value β, therefore, needs to be at least less than the performance consistency target.

In some embodiments, host rate adjuster 113 uses hysteresis to prevent rapid host rate switching when the system has not had time to properly calibrate. For example, rather than comparing the delta value to the historic delta value, host rate adjuster 113 instead compares the delta value to the historic delta value with a hysteresis buffer of $$\pm \frac{HistoricDeltaValue}{e}.$$

Host rate adjuster 113 changes the host rate when the delta value is outside of this hysteresis buffer zone, allowing time for the system to stabilize. Host rate adjuster 113 may use the following equations $$DeltaValue < \frac{(e-1)HistoricDeltaValue}{e} \text{ and}$$

$$DeltaValue > \frac{(e+1)HistoricDeltaValue}{e}$$

to determine whether to adjust the host rate. The value of e can be preset or determined by several factors, including the natural hysteresis of the system. For example, e depends on the time it takes for the free space to change in response to a change in host rate or depends on the time period between host rate changes. The longer the time for the free space to change in response to a changed host rate, therefore, the higher the value of e. Additionally, in embodiments with this hysteresis effect, host rate adjuster 113 does not always update the host rate when in the thin-adjust regions 260 and 265. In some embodiments, when host rate adjuster 113 does not update the host rate, these attempts are tracked and may be represented by NumAttempts. In such embodiments, host rate adjuster 113 compares the delta value divided by the number of attempts to the hysteresis buffer zone. Host rate adjuster 113 may use the following equations $$\frac{DeltaValue}{NumAttempts} < \frac{(e-1)HistoricDeltaValue}{e} \text{ and}$$

$$\frac{DeltaValue}{NumAttempts} > \frac{(e+1)HistoricDeltaValue}{e}$$

to determine whether to adjust the host rate, where NumAttempts=1 for the first attempt and is incremented by 1 each time. In some embodiments, NumAttempts is set to 0 when the samples stored reaches the sample threshold value to prevent the system from getting stuck in the thin-adjust regions 260 and 265.

For ideal region 255 and buffer regions 270 and 275, host rate adjuster 113 maintains the current host rate. For example, host rate adjuster 113 sets the host rate equal to the previous host rate or otherwise does not change the host rate. When in ideal region 255, the host rate is already ideal and does not need to be changed. When in buffer regions 270 and 275, the host rate is maintained to avoid a host rate overcorrection. Buffer regions 270 and 275 therefore provide a free space range where the host rate does not change, allowing the effects of previous host rate changes to be seen in the available free space. Buffer regions 270 and 275 allow host rate adjuster 113 to slowly adjust the host rate to ideal region 255 avoiding significant overcorrections.

For thick-adjust regions 280 and 285, host rate adjuster 113 increases or decreases the host rate by one of thick adjustment values $\alpha_1$ or $\alpha_2$. Host rate adjuster 113 determines whether to increase or decrease the host rate (i.e., determines the adjustment polarity) based on the delta value, the current free space value, the historic delta value, and the target free space value. Host rate adjuster 113 determines whether to use $\alpha_1$ or $\alpha_2$ for the thick adjustment value based on a comparison of the polarity of the historic delta value and the delta value.

When the polarity of historic delta value and the delta value are opposite, the delta free space has moved from one side of target free space line 205 to the thick-adjust region 280 or 285 on the other side. For example, when the historic delta value is negative and the delta value is positive, the delta free space has moved from below target free space line 205 to positive thick-adjust region 280 above target free space line 205. Opposite polarities may indicate an unsuitable region configuration such as the values of free space lines 210, 215, 220, 225, 230, 235, 240, and 245 not being suited to the current application. For example, an unsuitable region configuration includes when the values of the free space lines result in the sizes of the regions being too big or too small. Opposite polarities may also indicate an unsuitable host rate caused by a host rate adjustment that was too large or too small. Host rate adjuster 113 therefore adjusts the host rate by the smaller thick adjustment value $\alpha_2$. Host rate adjuster 113 compares the current free space value to the target free space value to determine whether to increase or decrease the host rate by the smaller thick adjustment value $\alpha_2$. For example, if the current free space value is greater than the target free space value, the delta value for the current sample (not including previous delta values) is positive, indicating that the free space increased since the last adjustment. Host rate adjuster 113 therefore increases the host rate by the smaller thick adjustment value $\alpha_2$ to slow down the host rate adjustment and minimize overcorrection.

When the polarity of historic delta value and the delta value are the same, the delta free space has remained on the same side of target free space line 205 and the free space is still in the furthest region from ideal region 255. Host rate adjuster 113 determines whether to adjust the by host rate by the larger thick adjustment value $\alpha_1$ or whether to maintain the current host rate. For example, host rate adjuster 113 compares the magnitude (i.e., absolute value) of the delta value and the historic delta value. When the magnitude of the historic delta value is larger than the magnitude of the delta value, the delta free space has moved closer to target free space line 205. Host rate adjuster 113 therefore maintains the current host rate to prevent overcorrection. When the magnitude of the delta value is larger than the magnitude of the historic delta value, the delta free space has moved farther from ideal free space line 210. Host rate adjuster 113 therefore adjusts the host rate by the larger thick adjustment value $\alpha_1$ eventually causing the delta free space value to decrease closer to ideal region 255 and target free space line 205. Host rate adjuster 113 determines whether to increase or decrease the host rate by the larger thick adjustment value $\alpha_1$ based on the polarity of the delta value. For example, when the delta value is positive, the delta free space is in positive thick-adjust region 280 and the historic delta value is above target free space line 205. Host rate adjuster 113 therefore increases the host rate by the larger thick adjustment value $\alpha_1$ to take up more free space eventually causing the delta free space value to decrease closer to ideal region 255 and target free space line 205. In some embodiments, rate adjuster 113 determines whether to increase or decrease the host rate by the larger thick adjustment value $\alpha_1$ based on the polarity of the historic delta value since the polarity of the delta value and the historic delta value are the same.

As with the value of thin adjustment value $\beta$, the values of thick adjustment values $\alpha_1$ and $\alpha_2$ are determined according to the performance consistency target. For example, for a performance consistency measured using the $99.9^{th}$ percentile slowest IOPS divided by the average IOPS, the performance consistency target is 0.1%. Any adjustments made to the host rate should therefore be less than 0.1% for the performance consistency target to be reachable. Thick adjustment values $\alpha_1$ and $\alpha_2$, therefore, need to be at least less than the performance consistency target. Additionally, thick adjustment value $\alpha_1$ is larger than thick adjustment value $\alpha_2$, which is in turn larger than thin adjustment value $\beta$. The following relationship therefore holds true for the performance consistency target and the adjustment values: PerformanceConsistencyTarget>$\alpha_1$>$\alpha_2$>$\beta$. In one embodiment, when the performance consistency target is 0.1%, $a_1$=0.0977%, $a_2$=0.0488%, and $\beta$=0.0244%

FIGS. 3A, 3B, and 3C illustrate a flow diagram of an example method 300 to adjust the host rate using free space values, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the host rate adjuster 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 302, the processing device determines whether the device is in steady state. For example, host rate adjuster 113 determines whether a memory device or a portion thereof, such as memory device 140 of FIG. 1, is in a steady state. In some embodiments, the processing device determines whether the memory device is in steady state by monitoring the performance consistency. For example, host rate adjuster 113 monitors the IOPS and determines the performance consistency using a given percentile of the slowest IOPS divided by the average IOPS. When the performance consistency has stayed within a predetermined threshold for a given period of time, the processing device determines that the memory device is in steady state. In other embodiments, the processing device determines that the memory device is in steady state after a predetermined period of time during which the memory device is running. In still other embodiments, the processing device uses other metrics to determine whether the memory device is in steady state, such as monitoring transient behavior of the memory device. When the memory device is in steady state, the method 300 proceeds to operation 304. When the memory device is not in steady state, the method 300 returns to operation 302. If the memory device is not yet in steady state, there may still be transitory behavior that can result in unforeseen or unintended changes in free space. The method 300 therefore, does not continue until the likelihood of transitory behavior has been reduced (e.g., the memory device is in steady state).

At operation 304, the processing device receives current free space value and the historic delta value. For example, host rate adjuster 113 receives a current free space value and a historic delta value based on the free space of a memory device. The current free space value is a value representing the amount of space in the memory device that does not have data or does not have valid data. In some embodiments, the processing device receives the current free space value and the historic delta value from a local memory, such as local memory 119 of FIG. 1. In other embodiments, the processing device receives the current free space value as a result of scanning the memory device for free space.

At operation 306, the processing device calculates the delta value. For example, host rate adjuster 113 calculates the delta value using the current free space, a target free space value, and the historic delta value as described above. The historic delta value may store information from multiple previous delta values (e.g., an average, median, mean, sum, or other value determined from multiple previous delta values). In other embodiments, host rate adjuster 113 calculates the delta value using the current free space, a target free space value, and multiple historic delta values.

At operation 308, the processing device determines the region in which the delta value falls. For example, host rate adjuster 113 determines a range of delta values that include the calculated delta value. The ranges of delta values are predetermined based on the memory device, performance consistency target, and other metrics, as described above. When the processing device determines that the delta region is the ideal region (e.g., ideal region 255 of FIG. 2) or either of the buffer regions (e.g., buffer regions 270 and 275 of FIG. 2), method 300 proceeds to operation 310. When the processing device determines that the delta region is either of the thick-adjust regions (e.g., thick-adjust regions 280 and 285 of FIG. 2), method 300 proceeds through off-page connector A to operation 318. When the processing device determines that the delta region is either of the thin-adjust regions (e.g., thin-adjust regions 260 and 265 of FIG. 2), method 300 proceeds through off-page connector B to operation 332.

At operation 310, the processing device sets the host rate to the previous host rate. For example, host rate adjuster 113 sends the host rate to the host device, such as host system 120 of FIG. 1, causing the host device to maintain its host rate at the previous host rate. In some embodiments, because the updated host rate is the same as the previous host rate, the processing device does not send a new host rate to maintain the host rate the same.

At operation 312, the processing device updates the historic delta value. For example, host rate adjuster 113 updates the historic delta value by adding the delta value to the historic delta value. In some embodiments, host rate adjuster 113 averages the delta value with the historic delta value. In some embodiments, the processing device also increments the number of history samples.

At operation 314, the processing device determines whether the number of history samples satisfies a threshold. For example, host rate adjuster 113 determines whether the number of delta values represented by historic delta value is greater than a threshold value. In some embodiments, the threshold value is predetermined based on how fast the host rate changes, how fast the free space updates in response to a change in host rate, and other variables. When the processing device determines that the number of history samples is greater than the threshold, method 300 proceeds to operation 316. When the processing device determines that the number of history samples is not greater than the threshold, the method 300 returns to operation 304.

At operation 316, the processing device resets the historic delta value. For example, host rate adjuster 113 sets the historic delta value to 0 or another number representing no stored historic delta values. In embodiments using multiple historic delta values, host rate adjuster 113 shifts the oldest historic delta values out, making room for a new delta value.

At operation 318, the processing device determines whether the historic delta value and delta value have the same polarity For example, host rate adjuster 113 determines whether the historic delta value and the calculated delta value are the same polarity. When the processing device determines that the polarity of the calculated delta value and the historic delta value are the same, method 300 proceeds to operation 319. When the processing device determines that the polarity of the calculated delta value and the historic delta value are opposite, method 300 proceeds to operation 322.

At operation 319, the processing device determines whether the magnitude of the delta value is larger than the magnitude of the historic delta value. For example, host rate adjuster 113 determines whether the magnitude (i.e., absolute value) of the calculated delta value is greater than the magnitude (i.e., absolute value) of the historic delta value. When the processing device determines that the magnitude of the delta value is larger than the magnitude of the historic delta value, method 300 proceeds through off page connector D to operation 310 of FIG. 3A. When the processing device determines that the magnitude of the delta value is not larger than the magnitude of the historic delta value, method 300 proceeds to operation 320.

At operation 320, the processing device determines whether the polarity of the calculated delta value is positive. For example, host rate adjuster 113 determines whether the delta value is larger than 0. When the processing device determines that the delta value is positive, method 300 proceeds to operation 324. When the processing device determines that the delta value is not positive, method 300 proceeds to operation 326.

At operation 322, the processing device determines whether the current free space value is greater than the target free space value. For example, host rate adjuster 113 determines the free space value for the current sample is greater than the target free space value (i.e., whether the delta value for only the current sample is larger than 0. When the processing device determines that the current free space value is greater than the target free space value, method 300 proceeds to operation 328. When the processing device determines that the delta value is not positive, method 300 proceeds to operation 330.

At operation 324, the processing device increases the host rate by large thick adjustment value $\alpha_1$. For example, host rate adjuster 113 sends the new host rate (i.e., previous host rate increased by large thick adjustment value $\alpha_1$) to the host device, such as host system 120 of FIG. 1. This causes the host device to update its host rate to the new host rate.

At operation 326, the processing device decreases the host rate by large thick adjustment value $\alpha_1$. For example, host rate adjuster 113 sends the new host rate (i.e., previous host rate decreased by large thick adjustment value $\alpha_1$) to the host device. This causes the host device to update its host rate to the new host rate.

At operation 328, the processing device increases the host rate by small thick adjustment value $\alpha_2$. For example, host rate adjuster 113 sends the new host rate (i.e., previous host rate increased by small thick adjustment value $\alpha_2$) to the host device. This causes the host device to update its host rate to the new host rate.

At operation 330, the processing device decreases the host rate by small thick adjustment value $\alpha_2$. For example, host rate adjuster 113 sends the new host rate (i.e., previous host rate decreased by small thick adjustment value $\alpha_2$) to the host device. This causes the host device to update its host rate to the new host rate.

At operation 332, the processing device determines whether the polarity of the historic delta value is positive. When the processing device determines that the historic delta value is positive, method 300 proceeds to operation 334. When the processing device determines that the delta value is not positive, method 300 proceeds to operation 336.

At operation 334, the processing device determines whether the polarity of the delta value is positive. When the processing device determines that the delta value is positive, method 300 proceeds to operation 338. When the processing device determines that the delta value is not positive, method 300 proceeds to operation 342.

At operation 336, the processing device determines whether the polarity of the delta value is positive. When the processing device determines that the delta value is positive, method 300 proceeds to operation 344. When the processing device determines that the delta value is not positive, method 300 proceeds to operation 340.

At operation 338, the processing device determines whether the delta value is greater than the historic delta value. When the processing device determines that the delta value is larger than the historic delta value, method 300 proceeds to operation 344. When the processing device determines that the delta value is not larger than the historic delta value, method 300 proceeds to operation 342.

In some embodiments, the processing device compares the delta value to the historic delta value with a positive and negative threshold on either side of the historic delta value. For example, the threshold may be a fraction of the historic delta value (e.g., 1/e times the historic delta value). In an exemplary embodiment, the value of e is 5 and the threshold is therefore ⅕ of the historic delta value. In such an embodiment, the processing device therefore determines whether the delta value is greater than 6/5 times $$\left(\text{i.e., } HistoricDeltaValue + \frac{1}{e} HistoricDeltaValue\right)$$

the historic delta value or less than ⅘

$$\left(\text{i.e., } HistoricDeltaValue - \frac{1}{e} HistoricDeltaValue\right)$$

times the historic delta value. When the processing device determines that the delta value is greater than 6/5 times the historic delta value, method 300 proceeds to operation 344. When the processing device determines that the delta value is less than ⅘ times the historic delta value, method 300 proceeds to operation 342. When neither of these conditions are satisfied (i.e., the delta value is between ⅘ times the historic delta value and 6/5 times the historic delta value), the method 300 instead returns off-page to operation 310 of FIG. 3A (connection not illustrated). The fraction 1/e times the historic delta value may differ. For example, e may depend on the time it takes for the free space to change in response to a change in host rate. The longer the time it takes for the free space to change in response to a changed host rate, therefore, the higher the value of c.

In some embodiments, the processing device counts the number of attempts to adjust the host rate (i.e., number of times the delta value is between ⅘ times the historic delta value and 6/5 times the historic delta value). In such embodiments, the processing device divides the delta value by the number of attempts when comparing to the historic delta value with a positive and negative threshold as described above.

At operation 340, the processing device determiners whether the delta value is greater than the historic delta value. When the processing device determines that the delta value is larger than the historic delta value, method 300 proceeds to operation 342. When the processing device determines that the delta value is not larger than the historic delta value, method 300 proceeds to operation 344.

At operation 342, the processing device increases the host rate by thin adjustment value β. For example, host rate adjuster 113 sends the new host rate (i.e., previous host rate increased by thin adjustment value β) to the host device. This causes the host device to update its host rate to the new host rate.

In some embodiments, the processing device compares the delta value to the historic delta value with a positive and negative threshold on either side of the historic delta value. For example, the threshold may be a fraction of the historic delta value (e.g., 1/e times the historic delta value). In an exemplary embodiment, the value of e is 5 and the threshold is therefore ⅕ of the historic delta value. In such an embodiment, the processing device therefore determines whether the delta value is greater than 6/5

$$\left(\text{i.e., } HistoricDeltaValue + \frac{1}{e} HistoricDeltaValue\right)$$

times the historic delta value or less than ⅘

$$\left(\text{i.e., } HistoricDeltaValue - \frac{1}{e} HistoricDeltaValue\right)$$

times the historic delta value. When the processing device determines that the delta value is greater than 6/5 times the historic delta value, method 300 proceeds to operation 342. When the processing device determines that the delta value is less than ⅘ times the historic delta value, method 300 proceeds to operation 344. When neither of these conditions are satisfied (i.e., the delta value is between ⅘ times the historic delta value and 6/5 times the historic delta value), the method 300 instead returns off-page to operation 310 of FIG. 3A (connection not illustrated). The fraction 1/e times the historic delta value may differ. For example, e may depend on the time it takes for the free space to change in response to a change in host rate. The longer the time it takes for the free space to change in response to a changed host rate, therefore, the higher the value of c.

In some embodiments, the processing device counts the number of attempts to adjust the host rate (i.e., number of times the delta value is between ⅘ times the historic delta value and 6/5 times the historic delta value). In such embodiments, the processing device divides the delta value by the number of attempts when comparing to the historic delta value with a positive and negative threshold.

At operation 344, the processing device decreases the host rate by thin adjustment value β. For example, host rate adjuster 113 sends the new host rate (i.e., previous host rate decreased by thin adjustment value β) to the host device. This causes the host device to update its host rate to the new host rate.

Figure 4:
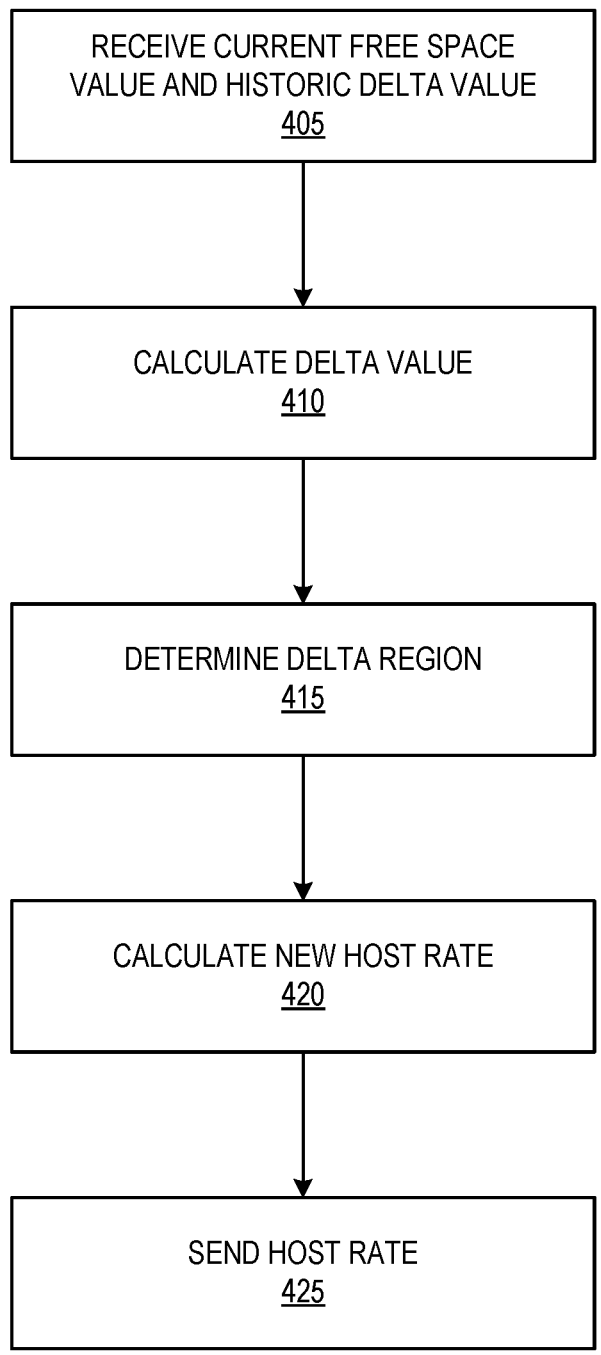
FIG. 4 is a flow diagram of an example method to adjust host rate using free space values in accordance with some embodiments of the present disclosure.

FIG. 4 is a flow diagram of an example method 400 to adjust the host rate using free space values, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the host rate adjuster 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing device receives the current free space value and the historic delta value. For example, host rate adjuster 113 receives a current free space value and a historic delta value based on the free space of a memory device. The current free space value is a value representing the amount of space in the memory device that does not have data or does not have valid data. In some embodiments, the free space includes garbage blocks with no valuable data (e.g., blocks that have been invalidated due to garbage collection). In other embodiments, free space includes the scanned space of a victim block (e.g., a source block to be deleted during garbage collection). In some embodiments, the processing device receives the current free space value and the historic delta value from a local memory, such as local memory 119 of FIG. 1. In other embodiments, the processing device receives the current free space value as a result of scanning the memory device for free space.

At operation 410, the processing device calculates the delta value. For example, host rate adjuster 113 calculates the delta value using the current free space, a target free space value, and the historic delta value. The target free space value is the optimal free space for a memory subsystem, such as memory subsystem 110 of FIG. 1. The target free space value is a free space value indicating a good balance between the production of free space (e.g., as a result of garbage collection) and the consumption of free space (e.g., due to host writes). The historic delta value may store information from multiple previous delta values. In other embodiments, host rate adjuster 113 calculates the delta value using the current free space, a target free space value, and multiple historic delta values.

At operation 415, the processing device determines the delta region. For example, host rate adjuster 113 determines a range of delta values including the calculated delta value. The ranges of delta values are predetermined based on the memory device, performance consistency target, and other metrics.

At operation 420, the processing device calculates the new host rate. For example, host rate adjuster 113 calculates the host rate using the calculated delta value, the historic delta value, and the determined delta region. The processing device calculates the host rate according to operations explained above in detail. For example, when the determined delta region is the ideal region or the buffer region, the processing device can calculate the new host rate as the current host rate as described with reference operation 310 of FIG. 3A. When the determined delta region is the thick-adjust region, the processing device can calculate the new host rate as the current host rate is increased or decreased by $α_1$ or $α_2$ or is the same as the current host rate as described with reference to operations 318, 319, 310, 320, and 322 of FIG. 3B. When the determined delta region is the thin-adjust region, the processing device can calculate the new host rate as the current host rate increased or decreased by β as described with reference to operations 332, 334, 336, 338, and 340 of FIG. 3C.

At operation 425, the processing device send the host rate to the host device. For example, host rate adjuster 113 sends the new host rate to the host device. This causes the host device to update its host rate to the new host rate. In some embodiments, when the updated host rate is the same as the previous host rate, the processing device does not send a new host rate to the host device, causing the host device to keep the host rate the same.

Figure 5:
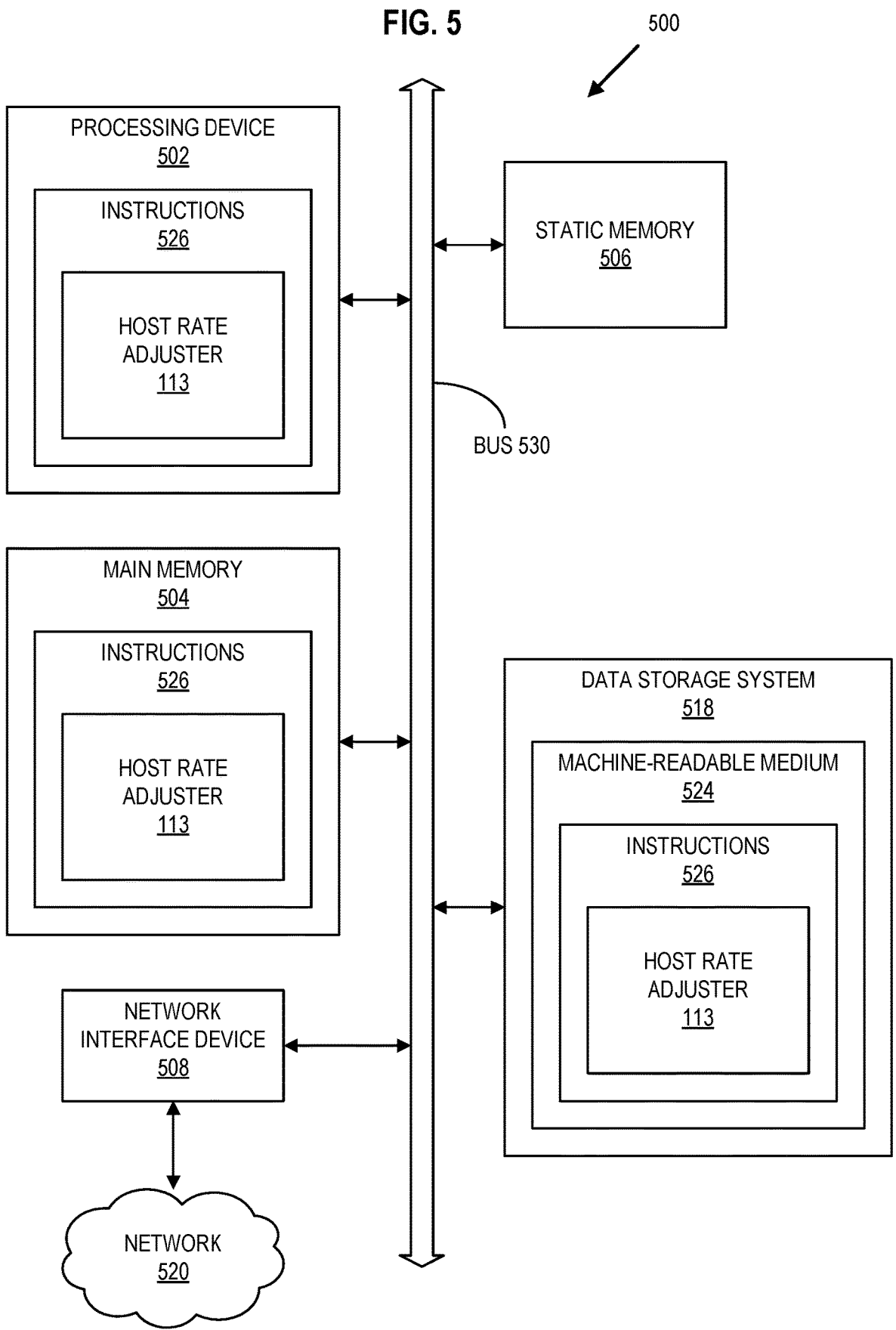
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the host rate adjuster 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to a host rate adjuster component (e.g., the host rate adjuster 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 300 and 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    calculating a delta value using a current free space value, a target free space value, and a historic delta value, wherein the historic delta value is determined using one or more previous delta values;
    determining a delta region of a plurality of delta regions using the delta value, wherein each delta region of the plurality of delta regions includes a contiguous range of delta values and wherein the determined delta region includes the calculated delta value;
    calculating a new host rate using the determined delta region and a current host rate; and
    sending the new host rate to a host device, wherein the host device changes the current host rate to the new host rate.

2. The method of claim 1, further comprising:
    updating the historic delta value using the calculated delta value.

3. The method of claim 2, wherein the plurality of delta regions includes an ideal region, a positive thin-adjust region, a negative thin-adjust region, a positive buffer region, a negative buffer region, a positive thick-adjust region, and a negative thick-adjust region, wherein:
    the ideal region includes the target free space value and is bounded by a positive ideal line and a negative ideal line;
    the positive thin-adjust region is bounded by the positive ideal line and a positive thin-adjust line;
    the negative thin-adjust region is bounded by the negative ideal line and a negative thin-adjust line;
    the positive buffer region is bounded by the positive thin-adjust line and a positive thick-adjust line;
    the negative buffer region is bounded by the negative thin-adjust line and a negative thick-adjust line;
    the positive thick-adjust region is bounded by the positive thick-adjust line and a positive steady state line;
    the negative thick-adjust region is bounded by the negative thick-adjust line and a negative steady state line; and
    wherein each of the positive ideal line, the negative ideal line, the positive thin-adjust line, the negative thin-adjust line, the positive thick-adjust line, the negative thick-adjust line, the positive steady state line, and the negative steady state line are determined by a distance to the target free space value.

4. The method of claim 3, wherein calculating the new host rate when the determined delta region is the ideal region, the positive buffer region, or the negative buffer region comprises using the current host rate as the new host rate.

5. The method of claim 3, wherein calculating the new host rate when the determined delta region is the positive or negative thick-adjust region comprises:
    determining a current polarity and a historic polarity, wherein the current polarity is a polarity of the calculated delta value and wherein the historic polarity is a polarity of the historic delta value;
    setting an adjustment polarity to the current polarity;
    comparing the current polarity with the historic polarity;
    determining a thick adjustment value using the comparison, wherein the thick adjustment value is larger when the current polarity is equal to the historic polarity than when the current polarity is opposite the historic polarity; and
    calculating the new host rate using the current host rate, the adjustment polarity, and the thick adjustment value.

6. The method of claim 3, wherein calculating the new host rate when the determined delta region is the positive or negative thick-adjust region comprises:
    determining a current polarity and a historic polarity, wherein the current polarity is a polarity of the calculated delta value and wherein the historic polarity is a polarity of the historic delta value;
    determining a sample polarity using the current free space value and the target free space value;
    setting an adjustment polarity to the sample polarity;
    comparing the current polarity with the historic polarity;
    determining a thick adjustment value using the comparison, wherein the thick adjustment value is larger when the current polarity is equal to the historic polarity than when the current polarity is opposite the historic polarity; and
    calculating the new host rate using the current host rate, the adjustment polarity, and the thick adjustment value.

7. The method of claim 3, wherein calculating the new host rate when the determined delta region is the positive or negative thin-adjust region comprises:
    determining a current polarity and a historic polarity, wherein the current polarity is a polarity of the calculated delta value and wherein the historic polarity is a polarity of the historic delta value;

comparing the current polarity with the historic polarity; and setting, in response to the current polarity and the historic polarity being opposite, an adjustment polarity to the current polarity.

8. The method of claim 3, wherein calculating the new host rate when the determined delta region is the positive or negative thin-adjust region comprises:
  determining a current polarity and a historic polarity, wherein the current polarity is a polarity of the calculated delta value and wherein the historic polarity is a polarity of the historic delta value;
  comparing the current polarity with the historic polarity;
  comparing, in response to the current polarity and the historic polarity being equal, the calculated delta value to the historic delta value; and
  setting, in response to the calculated delta value being larger than the historic delta value, an adjustment polarity to the current polarity.

9. The method of claim 3, wherein calculating the new host rate when the determined delta region is the positive or negative thin-adjust region comprises:
  determining a current polarity and a historic polarity, wherein the current polarity is a polarity of the calculated delta value and wherein the historic polarity is a polarity of the historic delta value;
  comparing the current polarity with the historic polarity;
  comparing, in response to the current polarity and the historic polarity being equal, the calculated delta value to the historic delta value; and
  determining, in response to the calculated delta value being smaller than the historic delta value, an adjustment polarity as opposite the current polarity; and
  calculating the new host rate using the current host rate, the adjustment polarity, and a thin adjustment value.

10. A non-transitory computer-readable storage medium comprising instructions that, when executed by a processing device, cause the processing device to:
  calculate a delta value using a current free space value, a target free space value, and a historic delta value, wherein the historic delta value is determined using one or more previous delta values;
  determine a delta region of a plurality of delta regions using the delta value, wherein each delta region of the plurality of delta regions includes a contiguous range of delta values and wherein the determined delta region includes the calculated delta value;
  calculate a new host rate using the determined delta region and a current host rate; and
  send the new host rate to a host device, wherein the host device changes the current host rate to the new host rate.

11. The non-transitory computer-readable storage medium of claim 10, wherein the processing device is further to:
  update the historic delta value using the calculated delta value.

12. The non-transitory computer-readable storage medium of claim 11, wherein the plurality of delta regions includes an ideal region, a positive thin-adjust region, a negative thin-adjust region, a positive buffer region, a negative buffer region, a positive thick-adjust region, and a negative thick-adjust region, wherein:
  the ideal region includes the target free space value and is bounded by a positive ideal line and a negative ideal line;
  the positive thin-adjust region is bounded by the positive ideal line and a positive thin-adjust line;
  the negative thin-adjust region is bounded by the negative ideal line and a negative thin-adjust line;
  the positive buffer region is bounded by the positive thin-adjust line and a positive thick-adjust line;
  the negative buffer region is bounded by the negative thin-adjust line and a negative thick-adjust line;
  the positive thick-adjust region is bounded by the positive thick-adjust line and a positive steady state line;
  the negative thick-adjust region is bounded by the negative thick-adjust line and a negative steady state line; and
  wherein each of the positive ideal line, the negative ideal line, the positive thin-adjust line, the negative thin-adjust line, the positive thick-adjust line, the negative thick-adjust line, the positive steady state line, and the negative steady state line are determined by a distance to the target free space value.

13. The non-transitory computer-readable storage medium of claim 12, wherein calculating the new host rate when the determined delta region is the ideal region, the positive buffer region, or the negative buffer region comprises using the current host rate as the new host rate.

14. The non-transitory computer-readable storage medium of claim 12, wherein calculating the new host rate when the determined delta region is the positive or negative thick-adjust region comprises:
  determining a current polarity and a historic polarity, wherein the current polarity is a polarity of the calculated delta value and wherein the historic polarity is a polarity of the historic delta value;
  setting an adjustment polarity to the current polarity;
  comparing the current polarity with the historic polarity;
  determining a thick adjustment value using the comparison, wherein the thick adjustment value is larger when the current polarity is equal to the historic polarity than when the current polarity is opposite the historic polarity; and
  calculating the new host rate using the current host rate, the adjustment polarity, and the thick adjustment value.

15. The non-transitory computer-readable storage medium of claim 12, wherein calculating the new host rate when the determined delta region is the positive or negative thick-adjust region comprises:
  determining a current polarity and a historic polarity, wherein the current polarity is a polarity of the calculated delta value and wherein the historic polarity is a polarity of the historic delta value;
  determining a sample polarity using the current free space value and the target free space value;
  setting an adjustment polarity to the sample polarity;
  comparing the current polarity with the historic polarity;
  determining a thick adjustment value using the comparison, wherein the thick adjustment value is larger when the current polarity is equal to the historic polarity than when the current polarity is opposite the historic polarity; and
  calculating the new host rate using the current host rate, the adjustment polarity, and the thick adjustment value.

16. The non-transitory computer-readable storage medium of claim 12, wherein calculating the new host rate when the determined delta region is the positive or negative thin-adjust region comprises:
  determining a current polarity and a historic polarity, wherein the current polarity is a polarity of the calculated delta value and wherein the historic polarity is a polarity of the historic delta value;

comparing the current polarity with the historic polarity; and setting, in response to the current polarity and the historic polarity being opposite, an adjustment polarity to the current polarity.

17. The non-transitory computer-readable storage medium of claim 12, wherein calculating the new host rate when the determined delta region is the positive or negative thin-adjust region comprises:

determining a current polarity and a historic polarity, wherein the current polarity is a polarity of the calculated delta value and wherein the historic polarity is a polarity of the historic delta value;

comparing the current polarity with the historic polarity;

comparing, in response to the current polarity and the historic polarity being equal, the calculated delta value to the historic delta value; and setting, in response to the calculated delta value being larger than the historic delta value, an adjustment polarity to the current polarity.

18. The non-transitory computer-readable storage medium of claim 12, wherein calculating the new host rate when the determined delta region is the positive or negative thin-adjust region comprises:

determining a current polarity and a historic polarity, wherein the current polarity is a polarity of the calculated delta value and wherein the historic polarity is a polarity of the historic delta value;

comparing the current polarity with the historic polarity;

comparing, in response to the current polarity and the historic polarity being equal, the calculated delta value to the historic delta value; and determining, in response to the calculated delta value being smaller than the historic delta value, an adjustment polarity as opposite the current polarity; and calculating the new host rate using the current host rate, the adjustment polarity, and a thin adjustment value.

19. A system comprising:

a plurality of memory devices; and a processing device, operatively coupled with the plurality of memory devices, to:

calculate a delta value using a current free space value, a target free space value, and a historic delta value, wherein the historic delta value is determined using one or more previous delta values;

determine a delta region of a plurality of delta regions using the delta value, wherein each delta region of the plurality of delta regions includes a contiguous range of delta values and wherein the determined delta region includes the calculated delta value;

calculate a new host rate using the determined delta region and a current host rate; and send the new host rate to a host device, wherein the host device changes a current host rate to the new host rate; and update the historic delta value using the calculated delta value.

20. The system of claim 19, wherein the plurality of delta regions includes an ideal region, a positive thin-adjust region, a negative thin-adjust region, a positive buffer region, a negative buffer region, a positive thick-adjust region, and a negative thick-adjust region, wherein:

the ideal region includes the target free space value and is bounded by a positive ideal line and a negative ideal line;

the positive thin-adjust region is bounded by the positive ideal line and a positive thin-adjust line;

the negative thin-adjust region is bounded by the negative ideal line and a negative thin-adjust line;

the positive buffer region is bounded by the positive thin-adjust line and a positive thick-adjust line;

the negative buffer region is bounded by the negative thin-adjust line and a negative thick-adjust line;

the positive thick-adjust region is bounded by the positive thick-adjust line and a positive steady state line;

the negative thick-adjust region is bounded by the negative thick-adjust line and a negative steady state line; and wherein each of the positive ideal line, the negative ideal line, the positive thin-adjust line, the negative thin-adjust line, the positive thick-adjust line, the negative thick-adjust line, the positive steady state line, and the negative steady state line are determined by a distance to the target free space value.

* * * * *